(12) United States Patent
Kucher et al.

(10) Patent No.: US 9,914,139 B2
(45) Date of Patent: Mar. 13, 2018

(54) BI-DIRECTIONAL LOWER CONE DILUTION DEVICE

(71) Applicants: Valentina Kucher, Skarholmen (SE); Gunnar Liliengren, Spanga (SE); Jan Backman, Jarfalla (SE)

(72) Inventors: Valentina Kucher, Skarholmen (SE); Gunnar Liliengren, Spanga (SE); Jan Backman, Jarfalla (SE)

(73) Assignee: GL&V Luxembourg S.a.r.l., Munsbach (LU)

( * ) Notice: Subject to any disclaimer, the term of this patent is extended or adjusted under 35 U.S.C. 154(b) by 52 days.

(21) Appl. No.: 14/934,909

(22) Filed: Nov. 6, 2015

(65) Prior Publication Data

US 2016/0129457 A1    May 12, 2016

Related U.S. Application Data

(60) Provisional application No. 62/076,817, filed on Nov. 7, 2014.

(51) Int. Cl.
| | |
|---|---|
| *B04C 5/081* | (2006.01) |
| *B04C 5/14* | (2006.01) |
| *B04C 5/18* | (2006.01) |
| *B01D 21/26* | (2006.01) |
| *D21D 5/24* | (2006.01) |

(52) U.S. Cl.
CPC ............ *B04C 5/081* (2013.01); *B01D 21/267* (2013.01); *B04C 5/14* (2013.01); *B04C 5/18* (2013.01); *D21D 5/24* (2013.01)

(58) Field of Classification Search
CPC .. B04C 5/081; B04C 5/14; B04C 5/18; B01D 21/267; D21D 5/24
See application file for complete search history.

(56) References Cited

U.S. PATENT DOCUMENTS 3,417,871 A * 12/1968 Arnold ...................... B04C 5/14
                                                              209/210
2006/0163153 A1* 7/2006 Caldelman .............. B04C 5/081
                                                              210/512.1

\* cited by examiner

*Primary Examiner* — David A Reifsnyder

(57) ABSTRACT

1. A hydrocyclone for separating a fiber suspension into a heavy fraction and including a distribution head for supplying a fluid to the separation chamber, which distribution head is situated centrally in the separation chamber relatively close to the other end. The distribution head has at least one outlet passage designed for spraying a fluid jet, the fluid jet having a flow component in the direction towards the other end of the separation chamber, and the fluid jet having another flow component directed towards the one end.

15 Claims, 4 Drawing Sheets

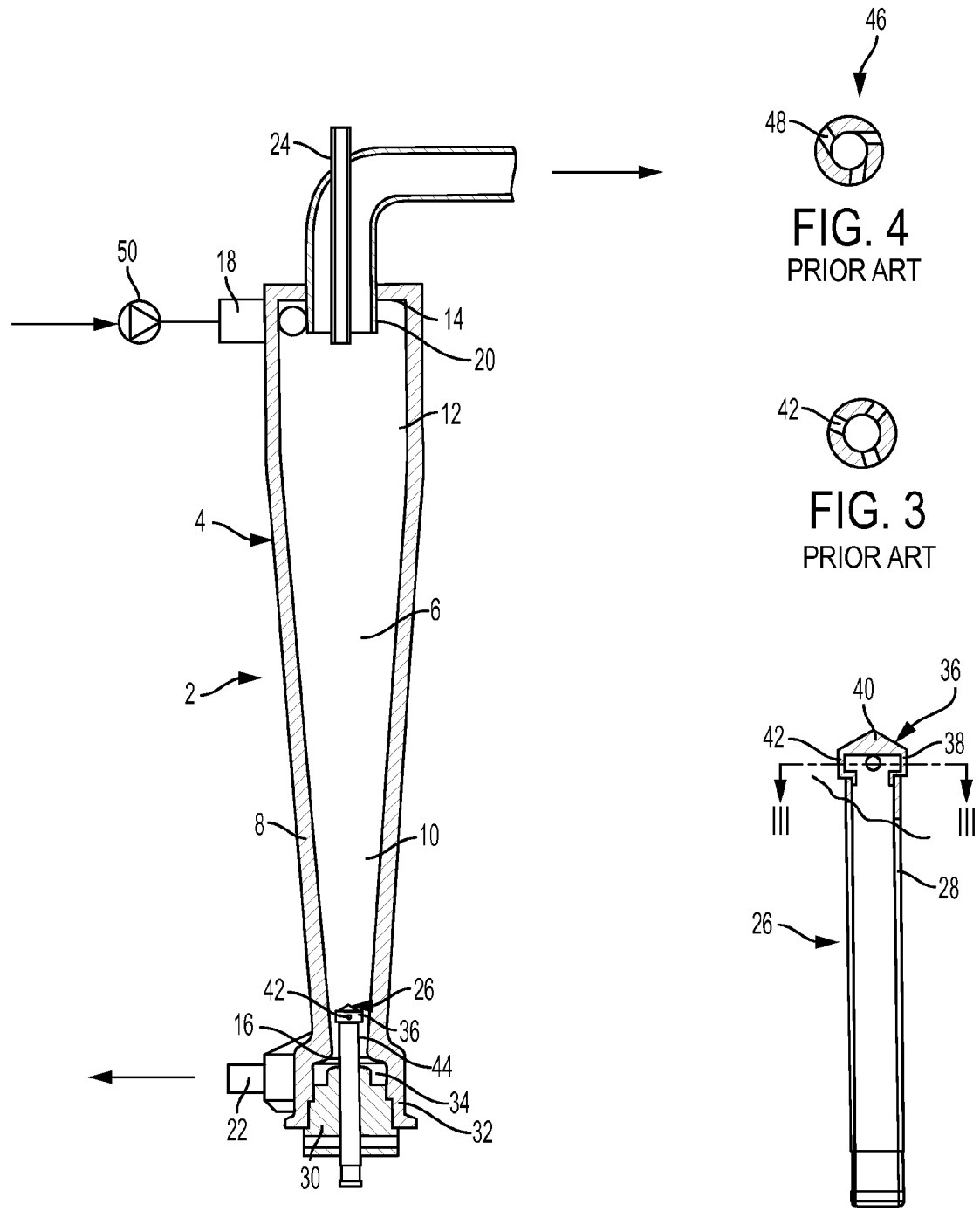

BI-DIRECTIONAL LOWER CONE DILUTION DEVICE

BACKGROUND

The present disclosure relates to a hydrocyclone for separating a fiber suspension into a reject fraction substantially containing heavy contaminants and an accept fraction substantially containing fibers, comprising a housing with a circumferential wall defining an elongated separation chamber with two opposite ends and with a center axis extending between the opposite ends. The hydrocyclone further comprises an inlet member for supplying the fiber suspension substantially tangentially into the separation chamber at one end thereof, so that the fiber suspension flows in a vortex in the separation chamber, a first outlet member for discharging the accepts fraction from the separation chamber at said one end, and a second outlet member for discharging the rejects fraction from the separation chamber at the other end thereof, and a distribution head for supplying a fluid to the separation chamber.

The '153 System:

An example of a conventional system can be found in US Published Application 2006/0163153 (the '153 system), which is incorporated herein in its entirety by reference. A portion of that description is reproduced below, and like numbers for similar items are used in all of the drawings.

The '153 system is described in more detail in the following drawings, in which FIG. 1 shows a view of an axial cross-section through a hydrocyclone, FIG. 2 shows an enlarged fluid supply device in the hydrocyclone according to FIG. 1, FIG. 3 shows a cross-section along the line III-III in FIG. 2, and FIG. 4 shows a modification of the embodiment according to FIG. 3.

In FIG. 1 there is shown an example of a hydrocyclone 2 according to the '153 system, specially dimensioned for separating a fiber suspension containing relatively light and heavy contaminants. The hydrocyclone 2 comprises a housing 4, which forms a separation chamber 6, which is 49 cm in length, with a circumferential wall 8. The separation chamber 6 has a conical chamber section 10, and a cylindrical chamber section 12 connecting the base of the conical chamber section 10, whereby the separation chamber 6 has a relatively broad base end 14 and an opposite relatively narrow open apex end 16.

There is an inlet member 18 for supplying the fiber suspension tangentially into the cylindrical chamber section 12 at the base end 14 of the separation chamber. A first outlet member in the form of a pipe 20 extends centrally a distance into the cylindrical chamber section 12 from the base end 14 of the separation chamber 6 for discharging a light fraction of fiber suspension substantially containing fibers. A second outlet member 22 is arranged at the apex end 16 of the separation chamber 6 for discharging a heavy fraction of the fiber suspension containing heavy contamination particles, such as sand, metal fragments and the like. A third outlet member in the form of a pipe 24 having a substantially smaller diameter than the pipe 20 extends centrally through the pipe 20 for discharging a further light fraction of the fiber suspension containing light contamination particles, such as plastic fragments and the like.

The hydrocyclone 1 further comprises a fluid supply device 26 for supplying liquid and/or gas to the conical chamber section 10 of the separation chamber 6 relatively close to the apex end 16. The fluid supply device 26 comprises a supply pipe 28 attached to a cylindrical plug 30 secured in the apex end 16 of the separation chamber 6. The circumferential wall 8 passes from the apex end 16 to a radially expanded portion 32 of the housing 4, which defines an open cylindrical chamber 34, which is closed by the plug 30, for example through threads, so that the supply pipe 28 extends centrally into the conical chamber section 10 via the apex end 16. The end of the supply pipe 28 in the separation chamber 6 is closed by a distribution head 36, which comprises a cylindrical wall 38 with two axial ends and a gable wall 40 covering one end of the wall 38 (see FIG. 2).

The wall 38 is provided with three radial bores forming outlet passages 42, which communicate with the interior of the supply pipe 28 (see FIG. 3). In this case, each outlet passage 42 opens in the conical chamber section 10 about 4 cm from the apex end 16. The distribution head 36 and the circumferential wall 8 of the conical chamber section 10 define an annular passage 44 for developed heavy fraction, the passage 44 having a radial extension of about 0.5 cm.

During operation of the hydrocyclone 1 according to FIG. 1, the fiber suspension, which contains relatively light and heavy contaminants, is pumped by a pump 50 tangentially into the separation chamber 6 via the inlet member 18, so that a vortex of the fiber suspension is created in the separation chamber 6. As a result, the fiber suspension separates into an accepts fraction substantially containing fibers, which are discharged through the pipe 20, and a reject fraction containing relatively heavy contaminants, which are discharged through the outlet member 22. A mixture of water and air is sprayed by the fluid supply device 26 against the circumferential wall 8 of the conical chamber section 10 to dilute the developed thick heavy fraction and release embedded fibers, so that these may follow the developed light fiber fraction. The injected air separates in the form of bubbles inwardly in the separation chamber 6 and entrains light contaminants to the centrally situated pipe 24.

Of course, as an alternative, the fluid supply device 26 may only supply liquid or gas to the separation chamber 6.

Problem

A well-known problem that might arise during operation of hydrocyclones of this kind is that the heavy fraction, which typically has a substantially smaller flow than the light fiber fraction, thickens heavily and as a result might tend to clog. This problem is reduced by supplying the fluid in the form of liquid to the separation chamber in order to dilute the thickening heavy fraction.

The usage of a dilution device in hydrocyclone separation is today very common and installed on most cleaner plants in order to primarily minimize the loss of good fiber in the reject.

The existing designs offered to the pulp industry of the diluting devices that reduce fiber packing (or other insoluble particles) show problems during operation of the hydrocyclone.

SUMMARY

Disclosed herein is a hydrocyclone for separating a fiber suspension into a heavy fraction and including a distribution head for supplying a fluid to the separation chamber, which distribution head is situated centrally in the separation chamber relatively close to the other end. The distribution head has at least one outlet passage designed for spraying a fluid jet, the fluid jet having a flow component in the direction towards the other end of the separation chamber, and the fluid jet having another flow component directed towards the one end.

The hydrocyclone of the present disclosure provides an improved hydrocyclone of the kind described above, which can be operated with an improved separation efficiency and which is suited for separating contaminated fiber suspensions.

BRIEF DESCRIPTION OF THE DRAWINGS

FIG. 1 shows a view of an axial cross-section through a hydrocyclone.

FIG. 2 shows an enlarged fluid supply device in the hydrocyclone according to FIG. 1.

FIG. 3 shows a cross-section along the line III-III in FIG. 2.

FIG. 4 shows a modification of the embodiment according to FIG. 3.

Figure 6:
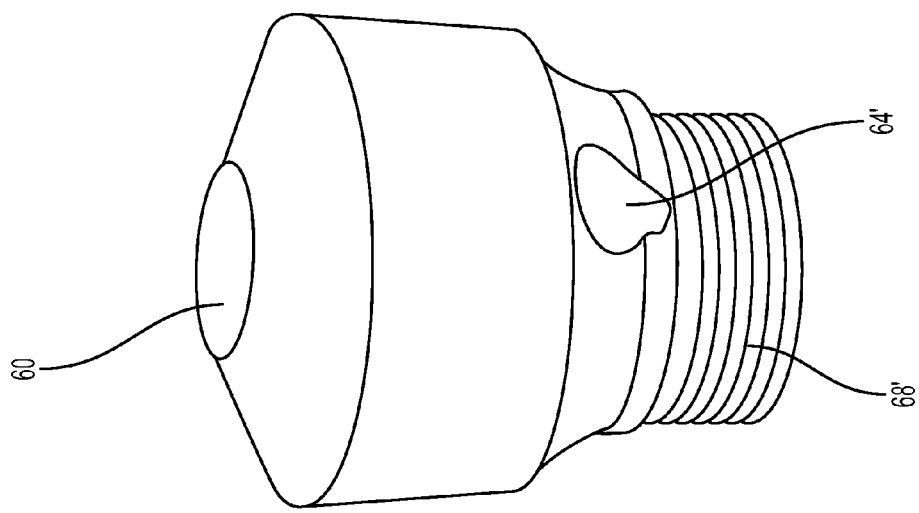
FIG. 6 is a side perspective view of the improved nozzle of FIG. 5.
Figure 5:
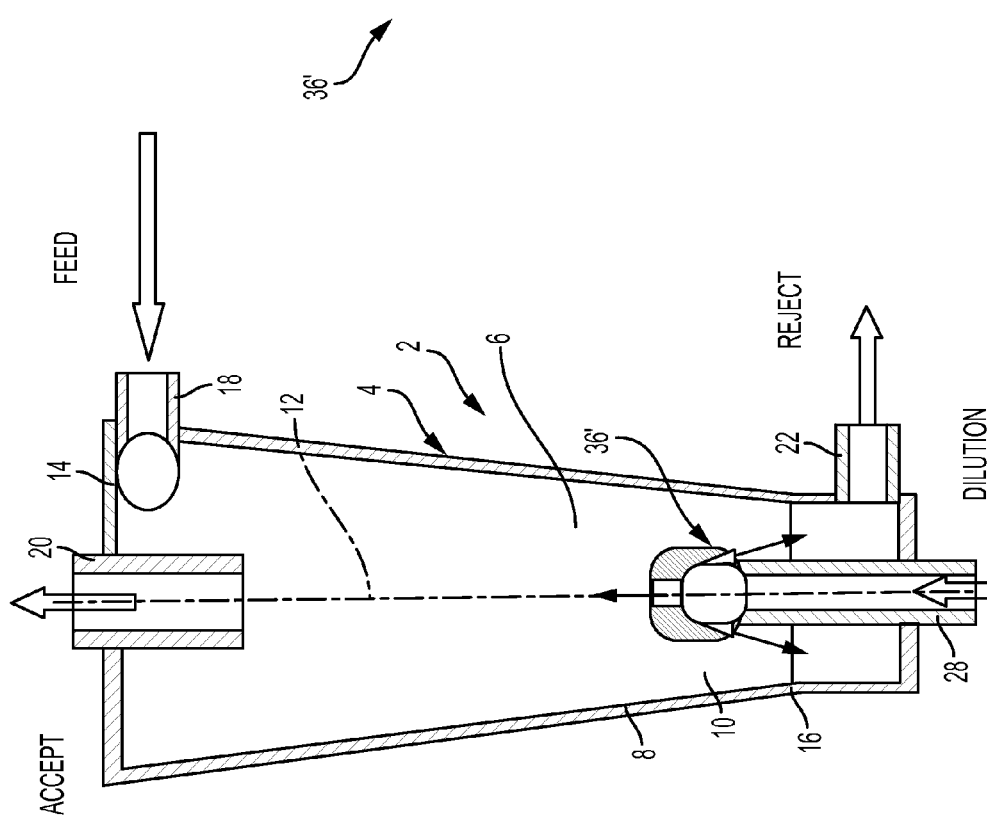
FIG. 5 is an improved system with the improved nozzle of this disclosure.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

PREFERRED EMBODIMENTS

Disclosed is a hydrocyclone of the kind described above in regards to the '135 system, but with a distribution head 36' designed such that the fluid jet sprayed from it has two flow components, with one component flowing towards one end 14 of the hydrocyclone, and the other component flowing in the direction towards the other end 16 of the hydrocyclone. Each flow component can by fed through one or more apertures or inlets. The separation chamber 6 has a center axis 17 extending between the base end 14 and the apex end 16.

The flow split between the two flow components is distributed in ranges of 25-75%.

Figures 7, 8:
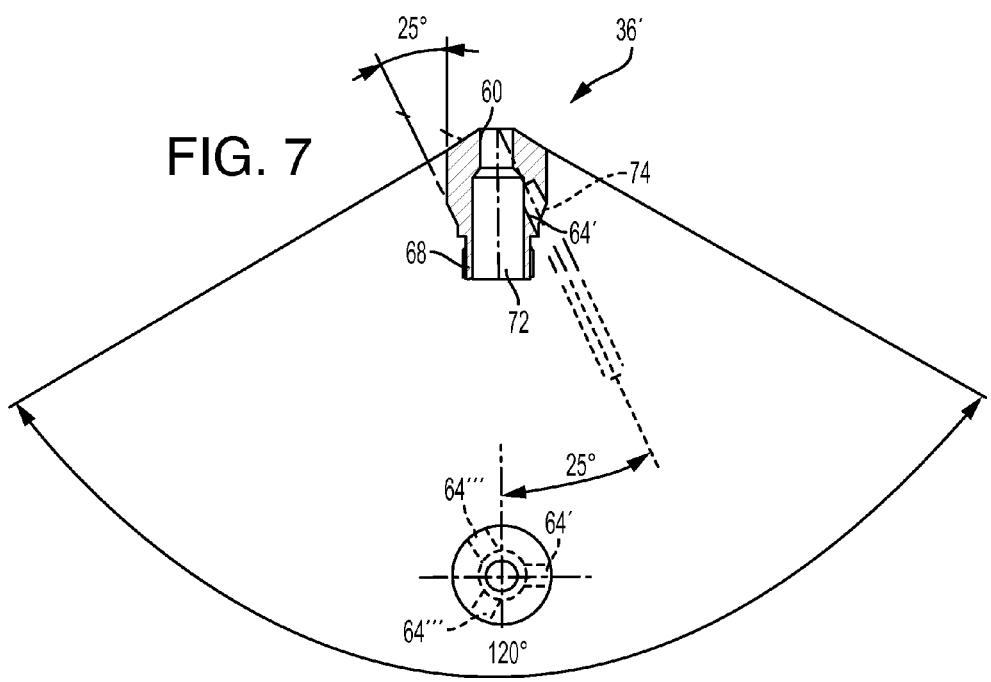
FIG. 7 is a cross sectional view of the improved nozzle of FIG. 5.
FIG. 8 is an end view of the improved nozzle of FIG. 5 showing in ghost three rearward directed passageways.

More particularly, as illustrated in FIG. 6, in the new improved nozzle system, the end of the supply pipe 28 in the separation chamber 6 is closed by a distribution head 36' in the form of a nozzle of the supply pipe 28. As shown in FIGS. 5 to 8, the nozzle 36' has a body 68 with a first passageway 72, an upward passageway 60, and three additional passages 74 formed by three angled holes 64', 64", and 64"', as shown in FIG. 8.

The upward passageway 60 and the three passageways 64', 64" and 64"' communicate with the interior of the supply pipe 28 via the first passageway 72.

More particularly, the dilution media is split in the nozzle 36' to one dispersant media flow stream centrally oriented and directed upwardly, and several smaller flow rays directed downwardly in the separation chamber near the underflow outlet. The flow split in the nozzle creates a pressure gradient. As a consequence, it introduces a pulsating action of the jet in the lower part of the hydrocyclone cone.

The proposed structure for the injection of the diluents or dispersant is the supply pipe which can be centrally positioned in the separation cone or inserted at the bottom of the cone or separation chamber of the hydrocyclone.

Attached to one end of the supply pipe 28 is the nozzle 36' for distribution of a liquid or a gas stream into the separation chamber of the hydrocyclone. The nozzle 36' is the main element of the dilution or dispersion device. In one embodiment, this nozzle is configured for generating the axial fluid jet directed upwards of about 60% of total flow and the fluid jets from the three holes 64 on the side of nozzle 36' as directed downward of about 40% of the total dilution flow. These downward rays are oriented opposite the upward liquid jet 60.

In one embodiment, the improved nozzle of this disclosure is a nozzle head for a 150 mm hydrocyclone, with an oval-cylindrical shape with internal diameter of 11 mm. The external diameter is 19 mm. The top of the nozzle has a rounded appearance. The nozzle diameter at the top of the central opening is 5-7 mm. At a distance about 15 mm from the top, there are the three lateral outlets with 3.5-5.0 mm holes distributed around the circumference of the nozzle head at even distances to each other.

Figure 9:
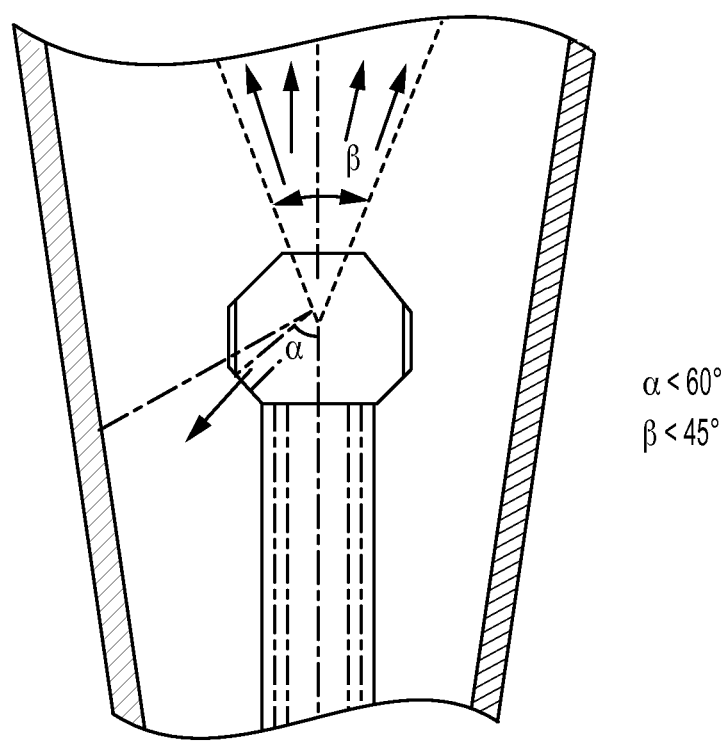
FIG. 9 is a partial cross sectional view of another embodiment of the improved nozzle showing in ghost one rearward directed passageway and one forward directed passageway in a portion of a hydrocyclone.

The outlet passage for each of the three holes is designed for spraying the fluid jet in a direction which forms an angle of less than the 60 degrees against the axial tube but preferably about 25 degrees. The flow from the top of the nozzle is mainly axially oriented and the flow spread angle is within an angle of 45 degrees from the axial direction of the hydrocyclone (see FIG. 9).

With this configuration, the main flow through the supply pipe 28 passes through the nozzle 36' and is divided into four streams.

The velocity gradient from the flow separation creates a pressure gradient; a pulsating character introduction of the jet stream in the dilution medium. This pulsating effect induces an additional reduction of fiber thickening and also positively influences the quality of treatment. Plugging of the outlet passages in this nozzle is less than with conventional nozzles.

The improved nozzle of this disclosure results in a significant reduction in thickening without compromising efficiency. This nozzle can be applied to clean high concentrated suspensions (cons.>1.5%). And it allows for the use of a wide flow range of dilution water or dispersion media in the cleaner.

The improved nozzle of this disclosure can also operate with higher fiber content in dilution water compared with existing nozzle designs.

The improved nozzle of this disclosure has a better run ability when compared with existing designs which have a tendency to plug.

During tests, dilution operating with the improved nozzle of this disclosure gave a significant reduction of thickening factor (up to 30% at 6% Dilution Water of Feed flow (DWF)) compared to a conventional system without dilution, with no compromise in efficiency.

In a conventional manner, the separation chamber normally has a conical chamber section with an apex end corresponding to the other end of the separation chamber. The distribution head should be situated in said conical chamber section, preferably so that the outlet passage of the distribution head opens in the conical chamber section at a distance from the apex end, which is 0 till 45%, preferably 3-15%, of the axial length of the conical chamber section. Furthermore, the radial extension of the annular passage defined by the distribution head and the circumferential wall of the conical chamber section of the separation chamber preferably is 6% to 60% of the radius in the conical chamber section axially in front of the distribution head.

In the embodiment of FIG. 7, the holes directed downwards extend along a plane that includes the central longitudinal axis of the hydrocyclone. In other embodiments (not shown), the holes directed downwards may be oriented radially from the longitudinal axis or have either a direction component in the swirl direction of the process media or a direction component in the opposite direction of the swirl.

Various other features of this disclosure are set forth in the following claims.

The invention claimed is:

1. A hydrocyclone for separating a fiber suspension into a heavy fraction substantially containing heavy contaminants and a light fiber fraction substantially containing fibers, comprising a housing with a circumferential wall, which defines an elongated separation chamber with two opposite ends and with a center axis extending between the opposite ends, an inlet member for supplying the fiber suspension substantially tangentially into the separation chamber at one end thereof, so that the fiber suspension flows in a vortex in the separation chamber, a first outlet member for discharging the accept fraction from the separation chamber at said one end, a second outlet member for discharging the heavy fraction from the separation chamber at the other end thereof, and a distribution head for supplying a fluid to the separation chamber, which distribution head is situated centrally in the separation chamber relatively close to said other end and having at least one outlet passage designed for spraying a fluid jet, the fluid jet having a flow component in the direction towards the other end of the separation chamber, and the fluid jet having another flow component directed towards the one end.

2. A hydrocyclone according to claim 1 wherein the flow split between the two flow components is distributed in ranges of 25-75%.

3. A hydrocyclone according to claim 2 wherein the flow component towards the one end is about 60% of the total flow from the distribution head.

4. A hydrocyclone according to claim 1 wherein the flow component toward the other end comprises at least three outlets.

5. A hydrocyclone according to claim 4 wherein the flow component toward the other end comprises three outlets, with each outlet extending along a plane that includes the central axis of the hydrocyclone.

6. A hydrocyclone according to claim 1 wherein the flow component toward the other end is in a direction obliquely against the circumferential wall of the separation chamber, as seen in a projection of the fluid jet on a plane extending perpendicular to the center axis of the separation chamber, forming an angle of less than the 60 degrees.

7. A hydrocyclone according to claim 6 wherein the flow component toward the other end is in a direction obliquely against the circumferential wall of the separation chamber, as seen in a projection of the fluid jet on a plane extending perpendicular to the center axis of the separation chamber, forming an angle of about 25 degrees.

8. A hydrocyclone according to claim 1 wherein the flow component toward the one end comprises one outlet.

9. A hydrocyclone according to claim 1 wherein the flow component toward the one end flows from the top of the nozzle mainly axially oriented.

10. A hydrocyclone according to claim 1 wherein the flow component toward the one end has a flow spread angle within an angle of 45 degrees from the longitudinal axis of the hydrocyclone.

11. A hydrocyclone for separating a fiber suspension into a heavy fraction substantially containing heavy contaminants and a light fiber fraction substantially containing fibers, comprising a housing with a circumferential wall, which defines an elongated separation chamber with two opposite ends and with a center axis extending between the opposite ends, an inlet member for supplying the fiber suspension substantially tangentially into the separation chamber at one end thereof, so that the fiber suspension flows in a vortex in the separation chamber, a first outlet member for discharging the accept fraction from the separation chamber at said one end, a second outlet member for discharging the heavy fraction from the separation chamber at the other end thereof, and a distribution head for supplying a fluid to the separation chamber, which distribution head is situated centrally in the separation chamber relatively close to said other end and having at least one outlet passage designed for spraying a fluid jet, the fluid jet having a flow component with a single outlet in the direction towards the one end of the separation chamber, and the fluid jet having another flow component comprising at least three outlets directed along the central axis of the hydrocyclone towards the other end.

12. A hydrocyclone according to claim 11 wherein the flow component towards the one end is about 60% of the total flow from the distribution head.

13. A hydrocyclone according to claim 11 wherein the flow component toward the other end comprises three outlets, with each outlet extending along a plane that includes the central axis of the hydrocyclone.

14. A hydrocyclone according to claim 11 wherein the flow component toward the other end is in a direction obliquely against the circumferential wall of the separation chamber, as seen in a projection of the fluid jet on a plane extending perpendicular to the center axis of the separation chamber, forming an angle of about 25 degrees.

15. A hydrocyclone according to claim 14 wherein the flow component toward the one end has a flow spread angle within an angle of 45 degrees from the longitudinal axis of the hydrocyclone.

* * * * *